(12) United States Patent
Chiu

(10) Patent No.: US 8,182,122 B2
(45) Date of Patent: May 22, 2012

(54) ROTATABLE LAMP WITH DUAL FUNCTIONS OF WIRED REMOTE CONTROL AND RADIO REMOTE CONTROL

(76) Inventor: Shih-Yung Chiu, Sindian (TW)

(*) Notice: Subject to any disclaimer, the term of this patent is extended or adjusted under 35 U.S.C. 154(b) by 216 days.

(21) Appl. No.: 12/759,852

(22) Filed: Apr. 14, 2010

(65) Prior Publication Data

US 2010/0259945 A1    Oct. 14, 2010

(51) Int. Cl.
*B60Q 1/06* (2006.01)
(52) U.S. Cl. .......... 362/428; 362/35; 362/272; 362/275; 362/287; 362/419
(58) Field of Classification Search ............... 362/35, 362/249.1, 269–275, 285–289, 418–419, 362/427–428
See application file for complete search history.

(56) References Cited

U.S. PATENT DOCUMENTS

2007/0041194 A1*   2/2007   Chiu ........................... 362/286

\* cited by examiner

*Primary Examiner* — Jason Moon Han

(74) *Attorney, Agent, or Firm* — Bacon & Thomas, PLLC

(57) ABSTRACT

A rotatable lamp with dual function of wired remote control and radio remote control comprising a lamp seat, a connecting mechanism, a first driving device, a second driving device, a base seat and a remote control PC board, wherein the lamp seat and the upper part of the connecting mechanism form a pivotal connection in vertical direction, and the lamp seat is driven by the first driving device installed on the connecting mechanism to generate angular motion in vertical direction; the lower part of the connecting mechanism and the base seat form a pivotal connection in horizontal direction, and the second driving device installed inside the base seat drives the connecting mechanism and the lamp seat to move angularly in horizontal direction; the remote control PC board is installed inside the base seat, and comprises a micro control unit (MCU), a radio receiving circuit and a wired control circuit, and the micro control unit is for controlling the ON and OFF of the bulb of the rotatable lamp and adjusting the illumination angle of the rotatable lamp according to the RF signal or wired control signal when the lamp is turned on.

6 Claims, 7 Drawing Sheets

ROTATABLE LAMP WITH DUAL FUNCTIONS OF WIRED REMOTE CONTROL AND RADIO REMOTE CONTROL

BACKGROUND OF THE PRESENT INVENTION

1. Field of the Present Invention

The invention relates to a rotatable lamp, more particularly to a rotatable lamp with dual functions of wired remote control and radio remote control.

2. Description of Prior Act

Shown in FIG. 1 is the conventional rotatable lamp 10 with wired remote control which comprises a lamp seat 30, a base seat 70 pivotally connected to the bottom side of the lamp seat and wired remote controller 90 connected to the power cord 75, and the lamp seat can be controlled by the wired remote controller 90 to vary the illumination angle in vertical and horizontal direction.

The conventional rotatable lamp 10 can be fastened on car roof of a vehicle or on deck of a yacht, and used as a search light. User inside the vehicle or cabin of a ship can turn on or turn off the lamp by pushing the lamp power switch SW5, or adjust the illumination angle of the rotatable lamp 10 by pushing the direction control switch SW1, SW2, SW3 and SW4 on the wired remote controller to move the light beam to the spot to be illuminated without need of adjusting or moving the direction or position of the car or yacht.

Shown in FIG. 2 is another conventional type radio remote control rotatable lamp 15 which is the same a multiple function lamp, able to change the illumination angle in vertical and horizontal direction, comprising at least a lamp seat 30, a base seat 70 pivotally connected to the bottom side of the lamp seat and a power cord 75. The user of the lamp can turn on or turn off the lamp, or adjust the illumination angle when the lamp is turned on by pushing the direction control switch SW1, SW2, SW3 and SW4 or the lamp power switch SW5 on the radio signal transmitter 95.

As illustrated in FIG. 3 the applicant has ever invented a wireless remote-controlled searchlight with improved manipulator 98 already been issued to U.S. Pat. No. 7,296, 917. The manipulator 98 is disclosed to improve the drawbacks of lacking dual function of radio/wired remote control of the rotatable lamp 10 or 15 mentioned above, which manipulator 98, in addition to has all the functions of the wired remote controller 90 shown in FIG. 1, also has a RF receiver 99 for receiving the radio frequency (RF) signal transmitted at remote place from the radio signal (RF) transmitter 95 shown in FIG. 2.

Therefore the manipulator 98 is used just as a switch-device. When power cord 75 is connected to power source, the manipulator 98 can provide the functions of sending out control signal through remote control wire or radio frequency signal transmitter, or turning on and off the power source. When the rotatable lamp 10 with wired remote control is connected to the manipulator 98 to form electrical connection, the user can select ON and OFF of the lamp, or vary the illumination angle of the lamp by pushing the lamp power switch SW5 or light beam direction control switch SW1, SW2, SW3 and SW4, but the rotatable lamp 10 with wired remote control or the rotatable lamp 15 with radio remote control still has no dual function of radio/wired remote control.

SUMMARY OF THE INVENTION

In view of the above, the main purpose of the present invention is to provide a rotatable lamp having the dual function of wired and radio remote control which enables the user to turn on and turn off the rotatable lamp, or vary the illumination angle of the rotatable lamp by means of radio remote control or wired remote control when the lamp is turned on.

The structure of the rotatable lamp of the present invention comprises a lamp seat, a connecting mechanism, a first driving device, a second driving device, a base seat and a remote control PC board, wherein the connecting mechanism comprises a turning shaft and a fixing plate with a pivotal shaft, the lamp seat is connected to the pivotal shaft of the connecting mechanism, and is driven by the first driving device on the fixing plate of the connecting mechanism to generate angular motion in vertical direction; the turning shaft of the connecting mechanism is formed on the bottom side of the fixing plate, and is pivotally connected to the base seat. And a second driving device formed on the fixing plate of the connecting mechanism or inside the base seat drives the lamp seat to move angularly in horizontal direction; The remote control PC board is installed inside the lamp seat or the base seat which comprises a RF receiver, a micro control unit (MCU), a wired control circuit and a bulb power circuit, wherein the RF receiver is for receiving RF signal and transmitting the RF signal to the micro control unit; The wired control circuit is for transmitting the input signal of the wired remote controller to the micro control unit; The micro control unit is for generating corresponding control signal to control the bulb power circuit and/or the motor driving circuit for supplying DC electric power.

The remote control PC board also has a motor driving circuit, and the micro control unit is for generating the corresponding signal according to the input signal to control the bulb power circuit and/or the motor driving circuit for supplying DC electric power.

The lamp seat has a stationary gear pivotally installed on the pivotal shaft of the connecting mechanism. The first driving device has a reversible motor and a pinion gear, the reversible motor is fastened on the fixing plate of the connecting mechanism, and the pinion gear engages with the stationary gear of the lamp seat, and drives the lamp seat to move angularly along the vertical direction.

The connecting mechanism further comprises a horizontal adjusting gear fixed on the lower end of the turning shaft from the inside of the base seat, and the second driving device comprises a reversible motors and a pinion gear, the reversible motor is fastened inside the base seat, and the pinion gear engages with the horizontal adjusting gear of the connecting mechanism and drives the horizontal adjusting gear to enable the lamp seat to generate angular motion in horizontal direction.

A stationary gear is fixed on the upper end of the base seat to form an integral part of the structure of the base seat, the second driving device comprises a reversible motor and a pinion gear of which the reversible motor is fastened on the fixing plate of the connecting mechanism, and the pinion gear engages with the stationary gear on the base seat to drive the horizontal adjusting gear of the connecting mechanism and the lamp seat to generate angular motion in horizontal direction.

BRIEF DESCRIPTION OF THE DRAWINGS

FIG. 1 is schematic drawing of the conventional type wired remote control rotatable lamp showing that a wired remote controller is employed for controlling the ON and OFF of the lamp or adjusting the lamp illumination angle in vertical and horizontal direction when the lamp is turned on.

FIG. 2 is the schematic drawing of the conventional radio remote control rotatable lamp showing that a radio transmitter is employed for controlling the ON and OFF of the lamp, and adjusting the lamp illumination angle in vertical and horizontal direction when the lamp is turned on.

FIG. 3 is the schematic drawing of the wired remote control rotatable lamp connected to a handheld controller having the switching function or controlled by a radio transmitter for controlling the ON and OFF of the lamp and adjusting the illumination angle of the lamp in vertical and horizontal direction when the lamp is turned on.

FIG. 4 is the schematic drawing of the rotatable lamp of the invention showing a wired remote controller or a radio transmitter can be employed to control the ON and OFF of the lamp, and adjust the illumination angle of the lamp in vertical and horizontal direction when the lamp is turned on.

DETAILED DESCRIPTION OF THE PREFERRED EMBODIMENTS

Figure 1:
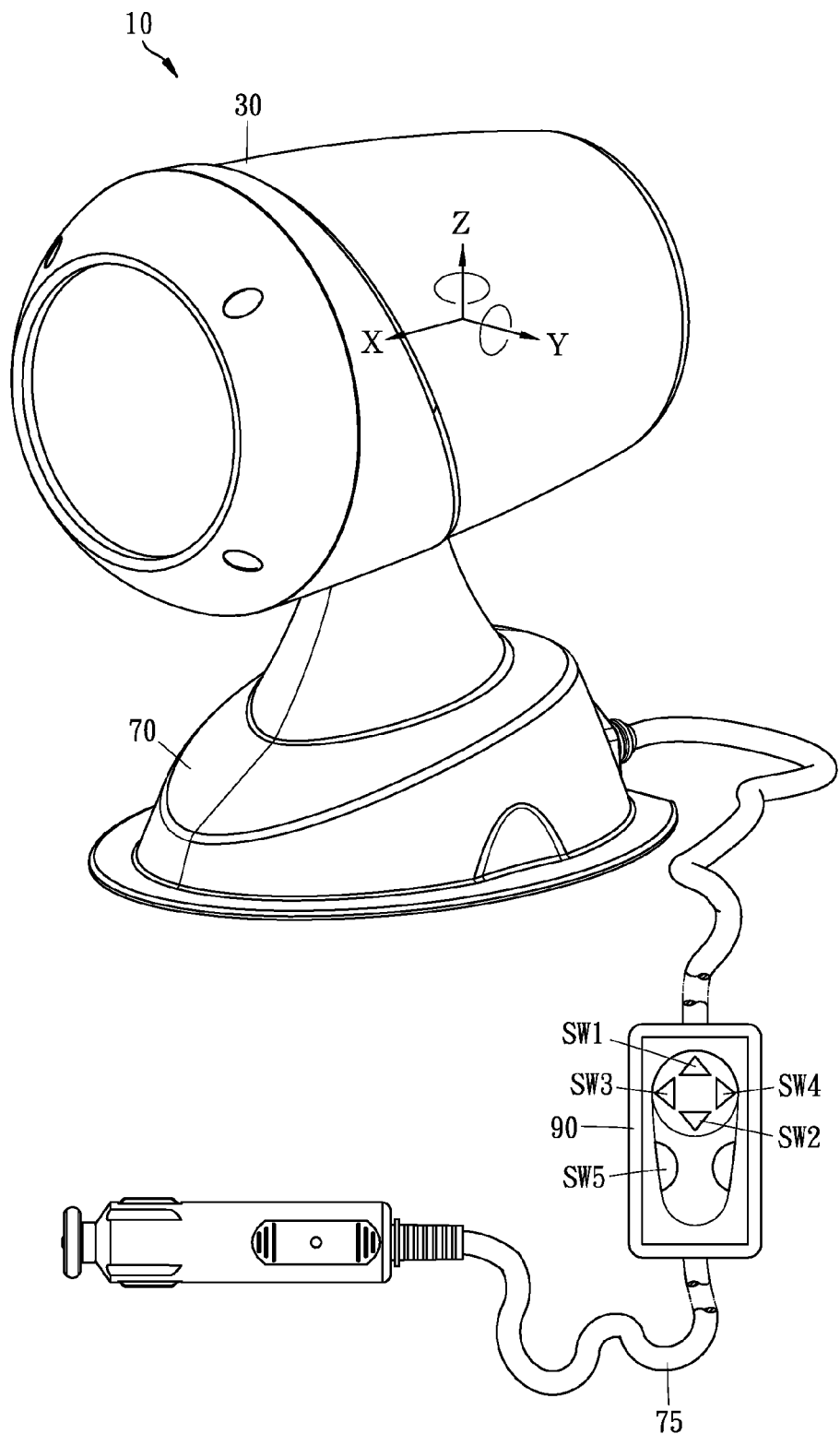
Figure 2:
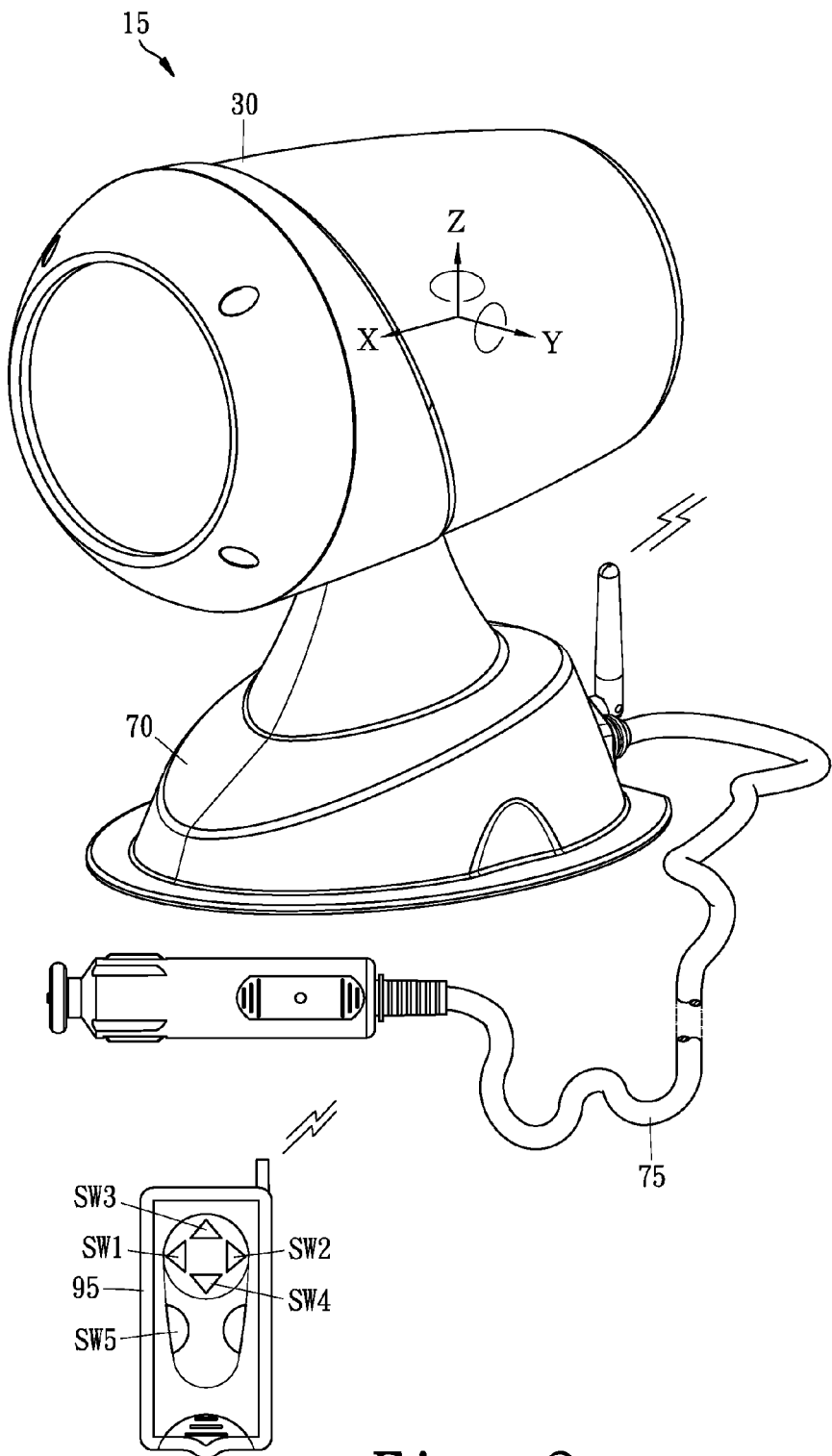
Figure 3:
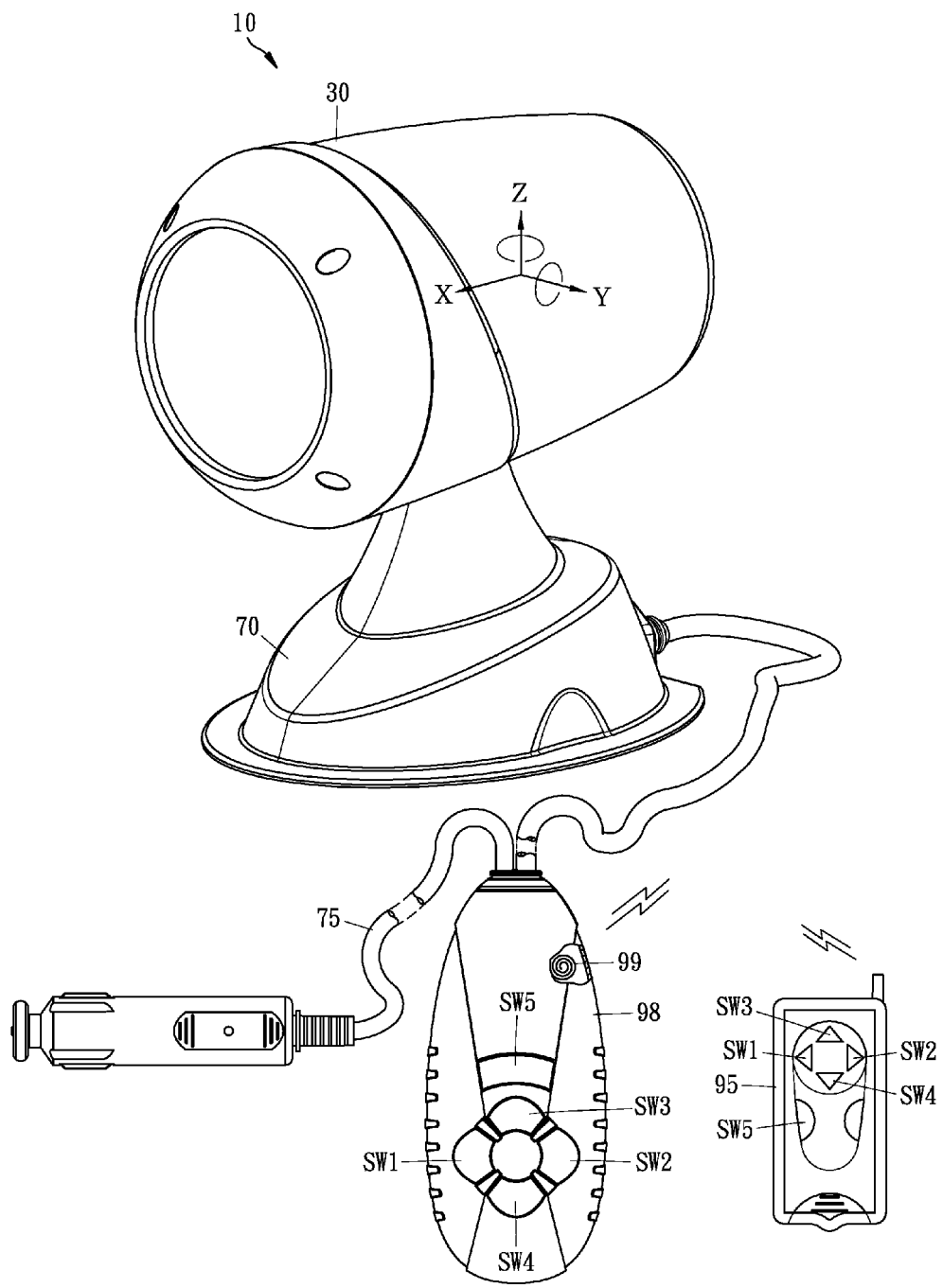
Figure 4:
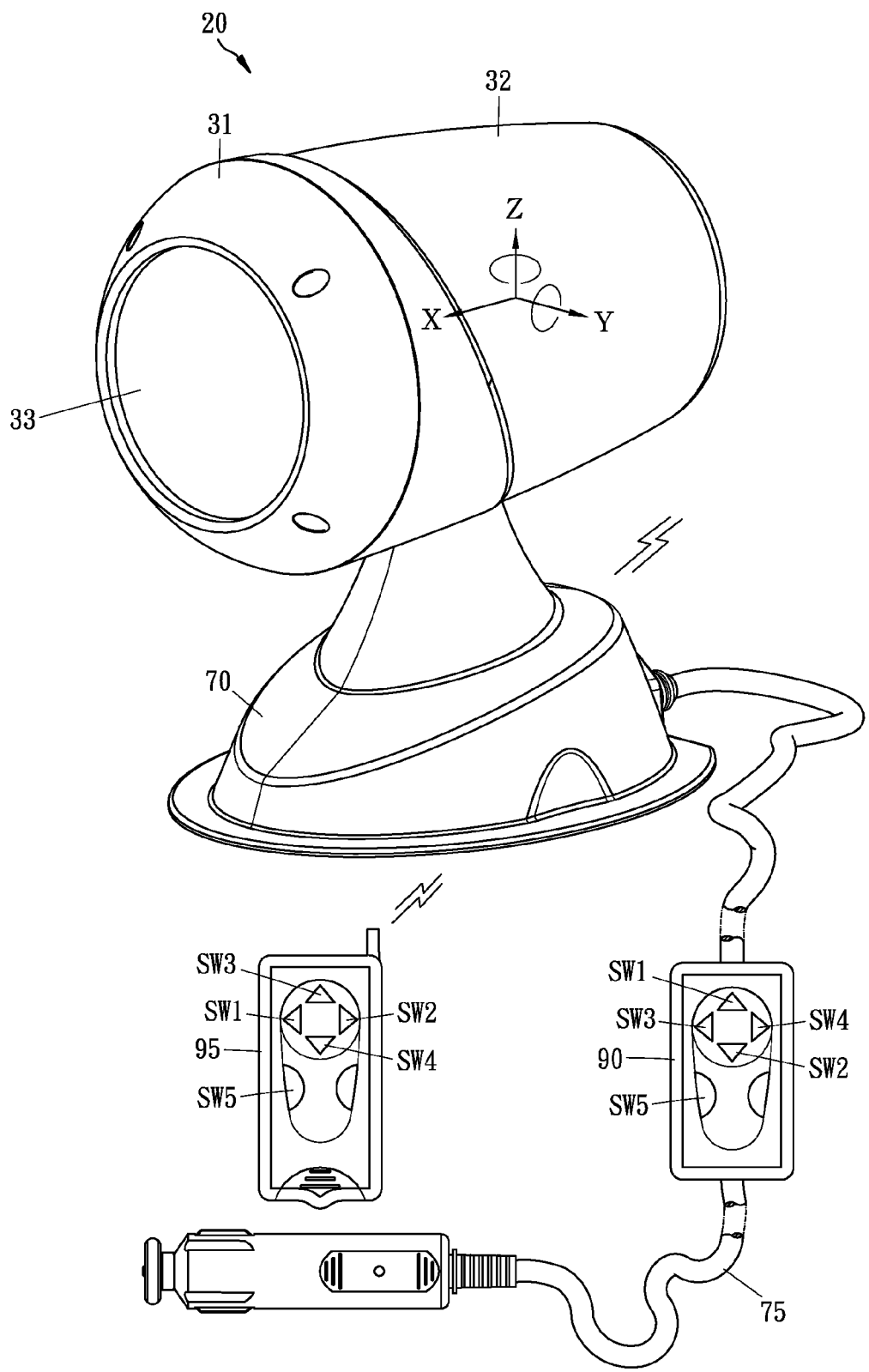
Figure 5:
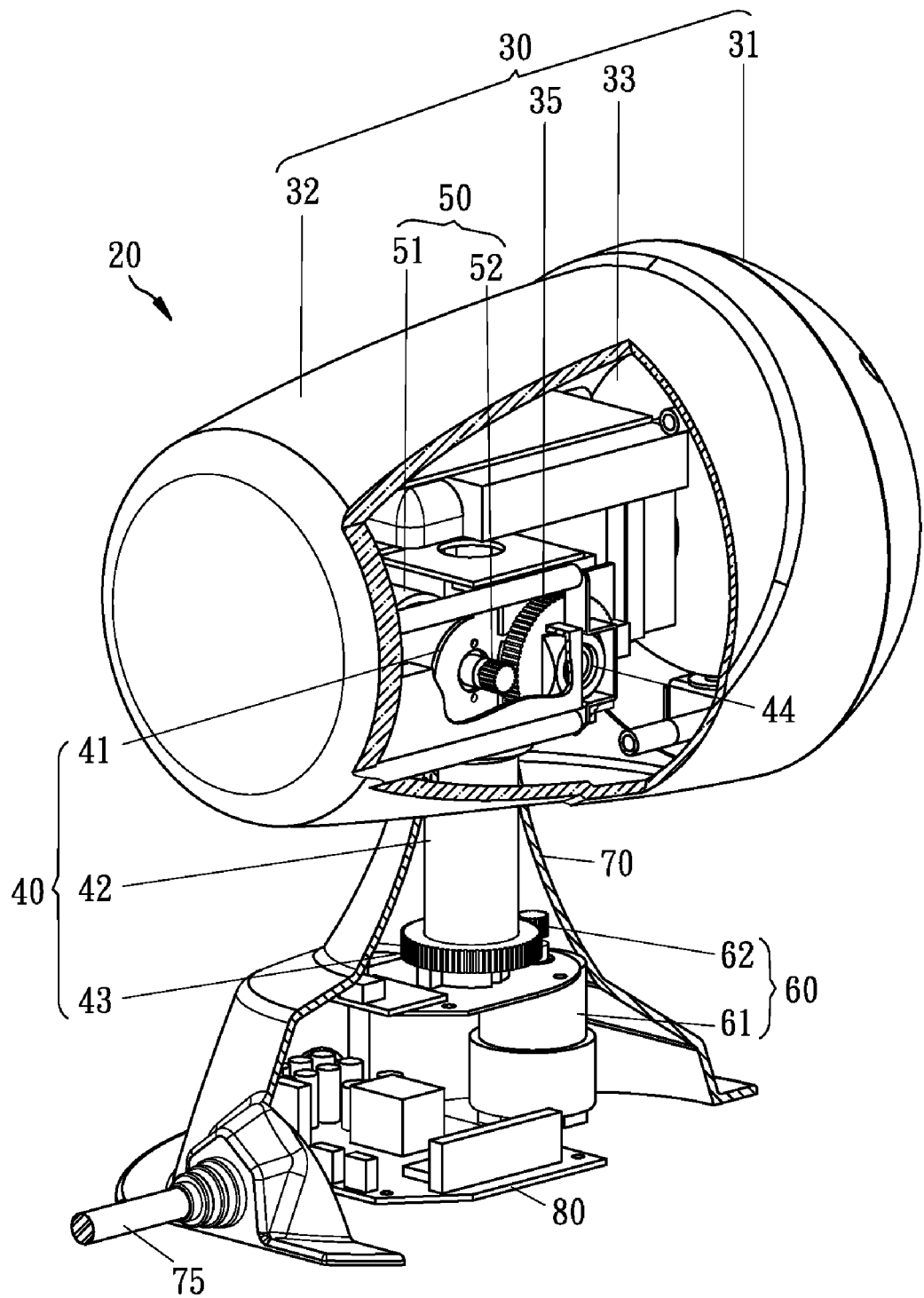
FIG. 5 is the partial sectional view of the rotatable lamp shown in FIG. 4.

As shown in FIGS. 4 and 5 the rotatable lamp 20 of the present invention can vary its illumination angle both in vertical and horizontal direction, and can be fastened on car roof of a vehicle or on deck of a yacht, user can adjust the illumination angle of the rotatable lamp 20 by employing a wired remote controller 90 or a radio signal transmitter 95.

The structure of the rotatable lamp 20 of the invention comprises a lamp seat 30, a connecting mechanism 40, a first driving device 50, a second driving device 60, a base seat 70 and a remote control PC board 80.

The lamp seat 30 comprises a front housing 31, a rear housing 32, a bulb 33, and a stationary gear 35 fastened inside the front housing 31 to form an integral part of the lamp seat 30.

The connecting mechanism 40 has a fixing plate 41, and a turning shaft 42, or further has a horizontal adjusting gear 43, wherein the fixing plate 41 of the connecting mechanism 40 is for installing the first driving device 50, and has a pivotal shaft 44 for installing the stationary gear 35 through which the pivotal shaft 44 is pivotally connected to lamp seat 30. The turning shaft 42 is formed on the bottom side of the fixing plate 41, and is pivotally connected to the base seat 70. The horizontal adjusting gear 43 is fastened to the lower end of the turning shaft 42 from the inner side of the base seat 70.

The first driving device 50 comprises a reversible motor 51 and a pinion gear 52. The pinion gear 52 is driven by the reversible motor 51 to turn in clockwise and counterclockwise direction, and the aforesaid parts are assembled in such a way that the reversible motor 51 is fastened on the fixing plate 41 of the connecting mechanism 40, and the pinion gear 52 engages with the stationary gear 35 of the lamp seat 30.

Hence between the lamp seat 30 and the connecting mechanism 40 is a pivotal connection which enables the lamp seat 30 to move angularly in vertical direction relative to the connecting mechanism 40.

The second driving device comprises a reversible motor 61 and a pinion gear 62. The pinion gear 62 is driven by the reversible motor 61 to turn in clockwise and counterclockwise direction, and the aforesaid parts are assembled in such a way that the reversible motor 61 is fastened inside the base seat 40, and the pinion gear engages with the horizontal adjusting gear 43 of the connecting mechanism 40.

Figure 7:
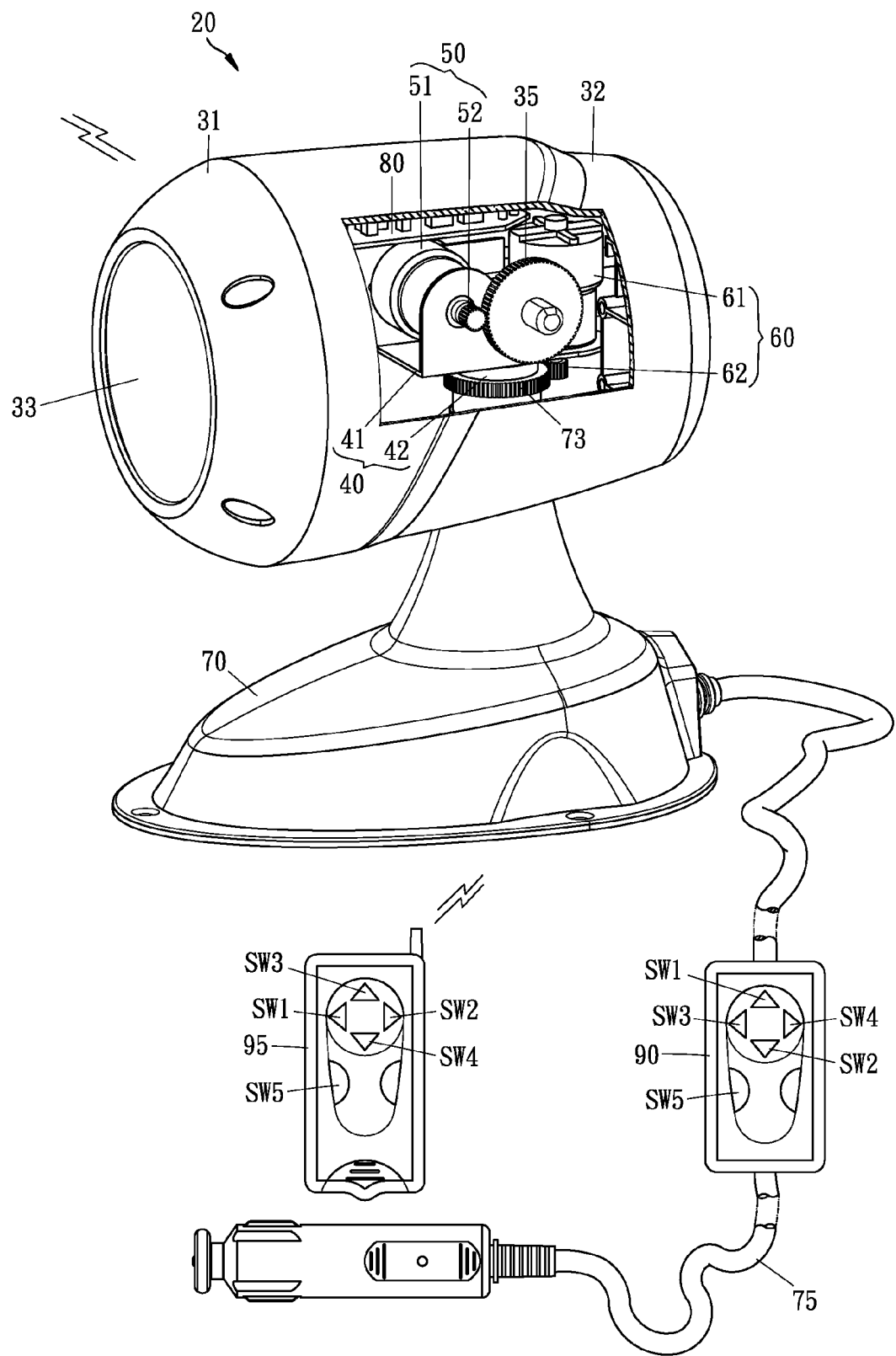
FIG. 7 is the structural drawing of another embodiment of the rotatable lamp of the invention.

Shown in FIG. 7 is another embodiment of the rotatable lamp 20 of the present invention which has the second driving device installed inside the lamp seat 30, and fastened on the fixing plate 41 of the connecting mechanism 40, in addition, a stationary gear 73 is fastened on the upper end of the base seat 70 to form an integral part of the base seat 70, and engages with the pinion gear 62 of the second driving device 60.

Hence, as illustrated in FIG. 5 or FIG. 7, between the base seat 30 and the connecting mechanism 40 is a pivotal connection through which the second driving device 60 can drive the connecting mechanism 40 to rotate horizontally in clockwise and counterclockwise direction, and enable the lamp seat 30 to rotate together with the connecting mechanism 40 horizontally in clockwise and counterclockwise direction to vary the illumination angle of the rotatable lamp 20 in horizontal direction.

Figure 6:
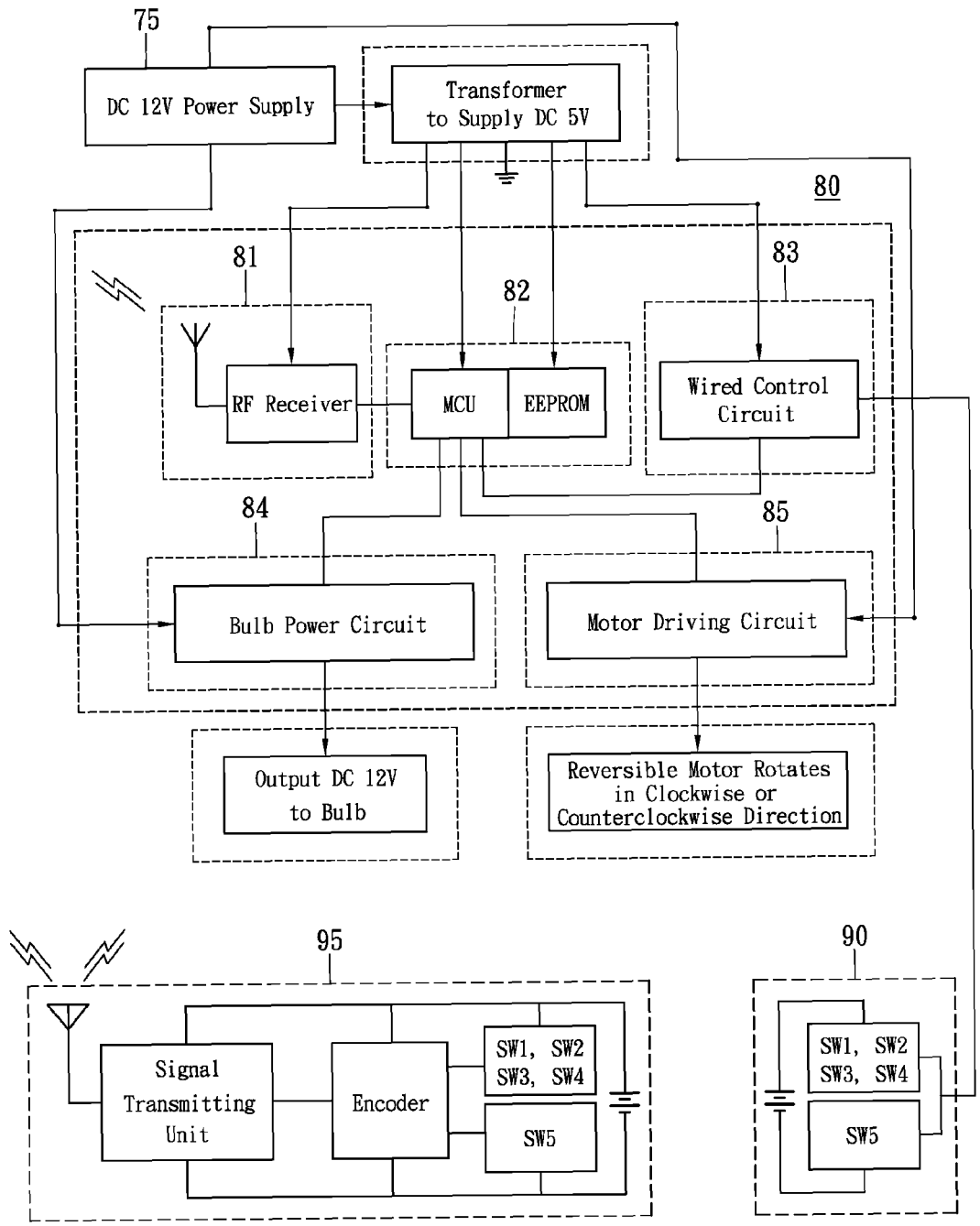
FIG. 6 is the electric circuit block diagram of the dual function of radio remote control and wired remote control of the rotatable lamp shown in FIG. 4.

Shown in FIG. 6 the remote control PC board 80 of the invention is connected to a power cord, for example, the PC board 80 can be connected to the plug of 12V DC cigarette lighter through power cord 75 to form electric connection for achieving the wired or radio remote control of the bulb 33 of the lamp seat 30, and the control of the reversible motor 51 of the first driving device 50 and/or the reversible motor 61 of the second driving device 60.

The remote control PC board 80 comprises at least a RF receiver 81, a micro control unit (MCU) 82, a wired control circuit 83, a bulb power circuit 84 and a motor driven circuit 85 for achieving the function of radio remote control and wired remote control of the rotatable lamp 20 of the invention, and the place for installing the remote control PC board 80 can be chosen to be arranged inside the lamp seat 30 or inside the base seat 70. The remote control PC board 80 also has a 5V transformer for supplying 5V electric power to RF receiver 81 and micro control unit (MCU) 82.

The micro control unit (MCU) 82 of the remote control PC board 80 is an IC element which can independently perform the specific control function, and is an integrated chip comprising central processing unit (CPU), Read Only Memory (RDM), electrically-Erasable Programmable Read Only Memory (EEPROM), Random Access Memory, (RAM), I/O control circuit, and Time counter (CTC). All the corresponding control message input from RF receiver 81 and wired control circuit 83 are already stored in the ROM and EEPROM.

The wired control circuit 83 of the wired remote control PC board 80 is for receiving the input signal from the direction control key SW1, SW2, SW3, SW4 and the bulb power key SW5 and transmits the signal to the input port of the micro control unit (MCU) 82, and the corresponding control signal shall be sent out by the micro control unit (MCU) 82 after the signal from the aforesaid control keys are confirmed by the micro control unit (MCU) 82.

The RF receiver 81 is for receiving the identification code and RF signal transmitted from another radio transmitter 95, and transferring the identification code and RF signal to the input port of the micro control unit (MCU) 82. After confirmation by MCU, the input RF signal is decoded to become corresponding control signal which is in turn transmitted out as control signal.

Hence the micro control unit (MCU) 82 can sent out corresponding control signal right after the receipt of the input information from the RF receiver 81 and the wired control circuit 83 for controlling the 12VDC power supply for the bulb power circuit 84 and the motor driving circuit 85.

Shown in FIG. 4 through FIG. 7, when the signal form the bulb power key SW5 transmitted remotely from the radio transmitter 95 is received by the RF receiver 81 of the remote control PC board 80, or when the signal from the bulb power key SW5 transmitted from the wired remote controller 90 is received by the wired control circuit 83 of the remote control PC board 80, the micro control unit (MCU) 82 will control the bulb power circuit 84 according to the input signal to determine whether the 12VDC power shall be supplied to the bulb to control the ON and OFF of the bulb 33 on the lamp seat 30 of the rotatable lamp 20.

When the RF receiver 81 of the remote control PC board 80 received the input signal from the direction control key SW1 or SW2 of the radio transmitter 95 at remote place, or when the wired control circuit 83 received the signal from the direction control key SW1 or SW2 of the wired remote controller 90, the micro control unit (MCU) 82 will, according to the input signal, control the motor driving circuit 85 and the supply of the 12VDC power to the reversible motor 51 of the first driving device 50 to adjust the illumination angle of the rotatable lamp in vertical direction.

When the RF receiver 91 of the remote control PC board 80 received the signal from the direction control key SW3 or SW4 of the radio transmitter 95, or when the wired control circuit 83 received the input signal from the direction control key SW3 or SW4 of the wired remote controller 90, the micro control unit (MCU) 82 will, according to the input signal, control the motor driving circuit 85, and the supply of the 12VDC power to the reversible motor 61 of the second driving device 60 to adjust the illumination angle of the rotatable lamp in horizontal direction.

Although the invention has been described in it preferred form, it is understood that partial change or modification of the invention which are apparent to those skills in the art without departing from the spirit of the invention shall still be covered by the range of the appended claims of the invention.

What is claimed is:

1. A rotatable lamp with dual function of wired remote control and radio remote control comprising a lamp seat, a connecting mechanism, a first driving device, a second driving device, a base seat and a remote control PC board, wherein the lamp seat has a bulb and a stationary gear which forms an integral part of the lamp seat structure;

the connecting mechanism comprises a fixing plate and a turning shaft, wherein the turning shaft is formed on the bottom side of the fixing plate, and is pivotally connected to the base seat; the fixing plate has a pivotal shaft which serves as means for achieving the pivotal connection between the lamp seat and the pivotal shaft through the stationary gear;

the first driving device is formed on the fixing plate of the connecting mechanism, and drives the lamp seat to move angularly in vertical direction by means of a pinion gear which engages with the stationary gear of the lamp seat;

the second driving device is formed inside the base seat or on the fixing plate of the connecting mechanism for driving the connecting mechanism and the lamp seat to move angularly in horizontal direction; and the remote control PC board is installed inside the base seat, and comprises a RF receiver, a micro control unit (MCU), a wired control circuit and a bulb power circuit, wherein the RF receiver is for receiving RF signal, and transferring the received RF signal to the micro control unit (MCU); the wired control circuit is for transferring the input signal of a wired controller to the micro control unit; the micro control unit is for generating corresponding control signal according to the input signal to control DC electric power to the bulb power circuit.

2. The rotatable lamp with dual function of wired remote control and radio remote control as described in claim 1, wherein the remote control PC board has a motor driving circuit, and the micro control unit is for generating the corresponding signal according to the input signal to control the DC power supplied to the bulb power circuit and/or the motor driving circuit.

3. The rotatable lamp with dual function of wired remote and radio remote control as described in claim 1, wherein the first driving device has a reversible motor and a pinion gear, the reversible motor is fastened on the fixing plate of the connecting mechanism and the pinion gear engages with the stationary gear.

4. The rotatable lamp with dual function of wired remote and radio remote control as described in claim 2, wherein the first driving device has a reversible motor and a pinion gear, the reversible motor is fastened on the fixing plate of the connecting mechanism and the pinion gear engages with the stationary gear.

5. The rotatable lamp with dual function of wired remote control and radio remote control as described in claim 3, wherein the connecting mechanism also has a horizontal adjusting gear fastened on the bottom end of the turning shaft from the inner-side of the base seat, and the second driving device has a reversible motor and a pinion gear, the reversible motor is fastened inside the base seat to enable the pinion gear to engage with the horizontal adjusting gear of the connecting mechanism.

6. The rotatable lamp with dual function of wired remote control and radio remote control as described in claim 3, wherein the stationary gear forming an integral part of the connecting mechanism is fastened on the upper end of the base seat, the second driving device has a reversible motor and a pinion gear, and the reversible motor is fastened on the fixing plate of the connecting mechanism to enable the pinion gear to engage with the stationary gear of the base seat.

* * * * *